July 27, 1954  J. A. PSENKA ET AL  2,684,612
BROACHING APPARATUS
Filed Oct. 22, 1951  2 Sheets-Sheet 2
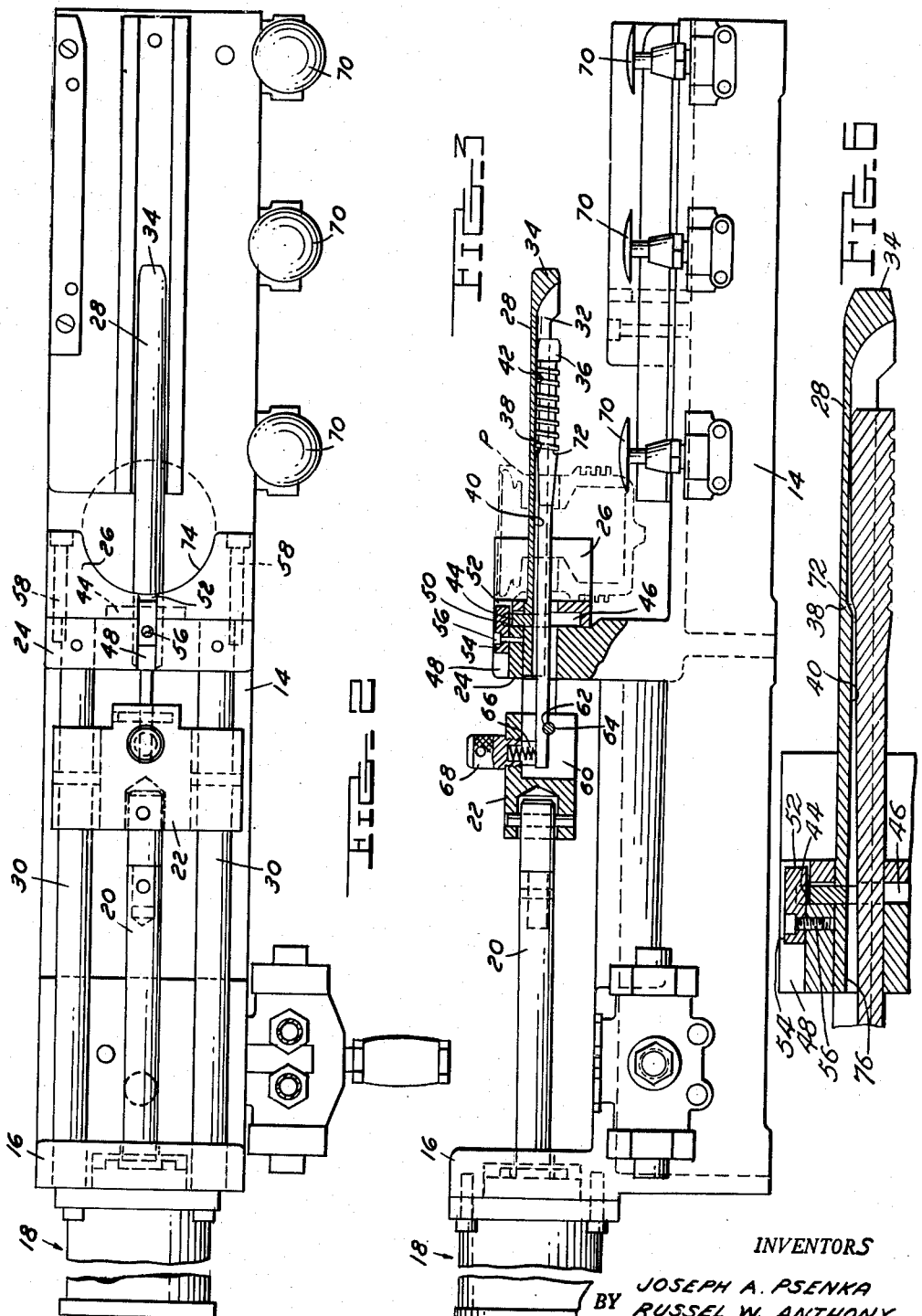
INVENTORS
JOSEPH A. PSENKA
BY RUSSEL W. ANTHONY
ATTORNEYS Patented July 27, 1954

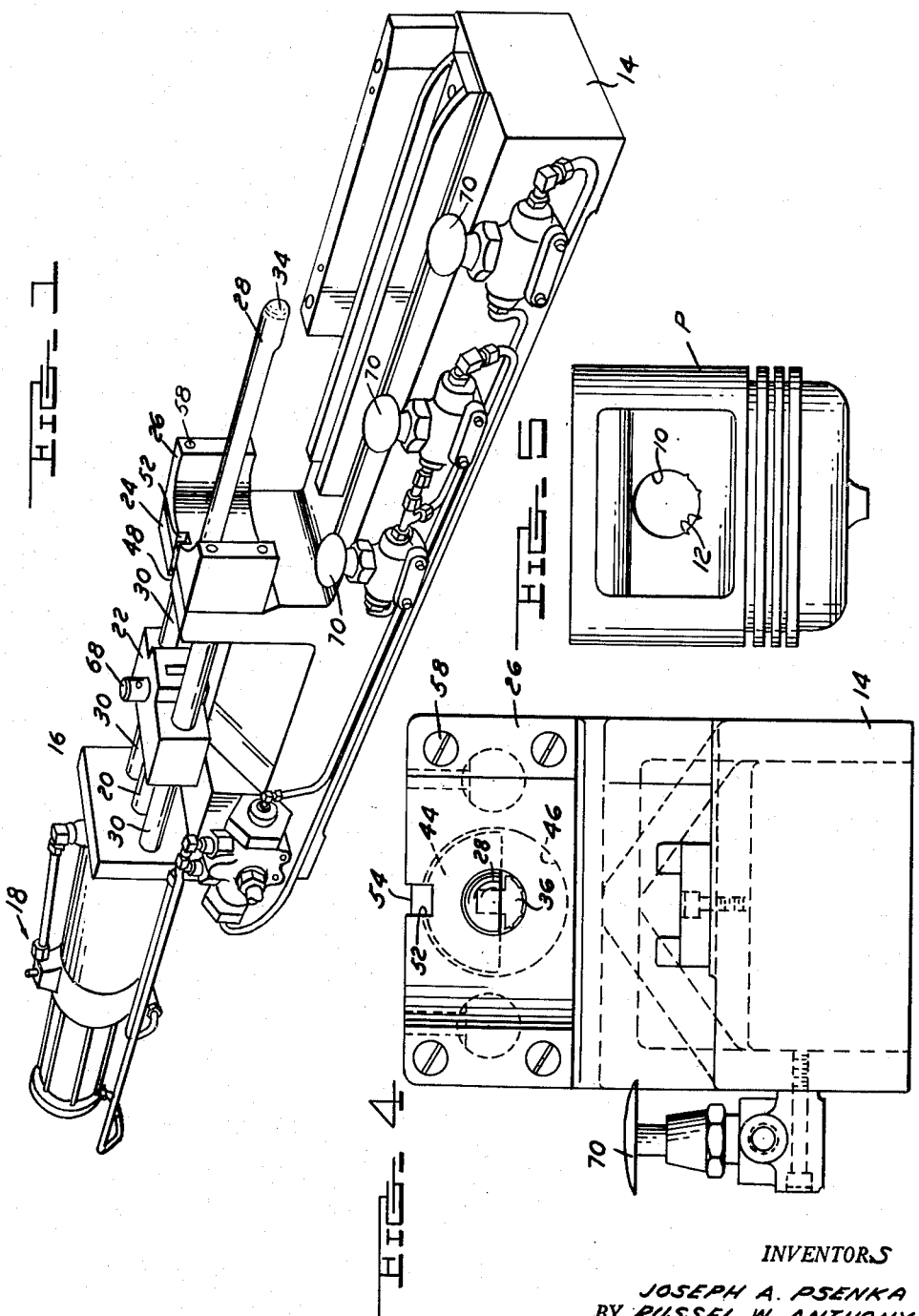

2,684,612

UNITED STATES PATENT OFFICE 2,684,612

BROACHING APPARATUS

Joseph A. Psenka and Russel W. Anthony, Detroit, Mich., assignors to National Broach & Machine Company, Detroit, Mich., a corporation of Michigan Application October 22, 1951, Serial No. 252,514

3 Claims. (Cl. 90—33)

The present invention relates to broaching apparatus and more particularly to apparatus effective to permit rapid broaching of portions of holes in a succession of work pieces.

One of the troublesome features of broaching holes in work pieces is that it is normally necessary to disconnect the broach from the broach pulling head after each work piece is broached, to permit mounting a new work piece on the machine or to thread the part over the broach, as in the case of a keyway pull broach. In the present case the machine is designed for broaching only a portion of the holes of a succession of work pieces and accordingly, it is made possible to carry out the broaching operation in an extremely rapid manner without the necessity of disconnecting the broach from the broach pulling head.

In general terms this is accomplished by supporting the work piece on a horn having a longitudinally extending recess at one side thereof, in which recess the broach is both longitudinally movable, and movable inwardly and outwardly of the recess, or at right angles to the longitudinal movement. Cam means are provided which permits the broach as it approaches the free or unsupported end of the horn, to move inwardly of the recess to a clearance position which permits loading the work piece over the horn and broach without interference. Thereafter, as the broach is drawn longitudinally in a direction toward the supported end of the horn, cam means intermediate the horn and broach, cam the broach outwardly of the recess to cutting position. The broach is then drawn completely through the work piece or at least to a final cutting position, in which the last tooth of the broach clears the work. In the event that the broach is not drawn completely through the work piece, the cam means permits movement of the broach inwardly of the recess upon completion of the cutting stroke. In either case the completed work piece may then be freely withdrawn from the horn without interference.

It is an object of the present invention to provide broaching apparatus for broaching portions of holes in work pieces in a rapid and efficient manner.

It is a further object of the present invention to provide broaching apparatus which permits loading of a succession of work pieces without the necessity for disconnecting the broach from the broach pulling head.

It is a feature of the present invention to provide a work supporting horn having a longitudinally extending recess along one side thereof, a broach in the recess movable both longitudinally therein, and inwardly and outwardly of the recess, together with cam means for controlling the last mentioned movement of the broach.

Other objects and features of the invention will become apparent as the description proceeds, especially when taken in conjunction with the accompanying drawings, wherein:

Figure 1 is a perspective view of the broaching apparatus.

Figure 2 is a plan view with parts broken away of the broaching apparatus.

Figure 3 is a side elevation of the broaching apparatus with parts broken away and with parts in section.

Figure 4 is an enlarged end view of the broaching apparatus as seen from the right in Figure 2.

Figure 5 is an elevational view of the work piece showing the work performed by the present apparatus.

Figure 6 is an enlarged fragmentary sectional view showing the cam portions of the horn and broach.

The broaching apparatus illustrated in Figures 1–4 is particularly designed to carry out a broaching operation in which a work piece has a hole therein, on which a broaching operation is to be carried out which operates over less than the entire inner surface of the work piece. Such a work piece is illustrated in Figure 5 where the piston P is shown as having a through opening 10 in which the broaching operation is to broach a series of grooves or serrations 12. Inasmuch as the broaching operation operates only on a portion of the inner circumference of the hole 10, it is possible to support the work piece P in a novel manner so that separation between the broach and the broach pulling head is not required.

Referring now specifically to Figures 1–4 the broaching apparatus comprises a base 14 having an upstanding bracket 16 carrying a power cylinder indicated generally at 18. Located within the cylinder 18 is a piston (not shown) connected to a piston rod 20 which in turn at its outer end is connected to a broach pulling head 22.

The base 14 is provided with a second upstanding bracket 24 to which is secured a work supporting fixture 26 and a work supporting and broach receiving horn 28. Extending between the brackets 16 and 24 are a pair of guide rods 30 on which the head 22 is longitudinally slidable.

Referring now specifically to Figure 3 the horn 28 is provided with a longitudinally extending recess 32 which extends completely to the supported end of the horn but which is closed by a head portion 34 at the free or unsupported end of the horn. The recess could extend completely to the free end of the horn, but the illustrated arrangement is preferred since it increases strength of the horn, improves ease of loading and prevents marring the work. The bottom wall of the recess 32 constitutes a cam surface which cooperates with a broach 36 and for this purpose the bottom wall of the recess 32 includes a camming step 38 separating an elevated dwell portion 40 and a depressed portion 42. At its inner end the horn 28 includes a generally semi-circular flange 44. The fixture 26 at its left hand side, as seen in Figure 3, has a circular recess 46 which receives the semi-circular flange 44 with clearance, the flange locating against the adjacent surface of bracket 24. At its top the bracket 24 has a keyway therein and a corresponding keyway 50 is provided in the top of the flange 44, as well as a keyway 52 in the top of the fixture 26. A key 54 is received in the three keyways 48, 50 and 52, and is secured in place by a screw 56. Thus the fixture 26 and the horn 34 are supported in properly aligned and accurately maintained position. The fixture 26, as indicated in Figure 2, is additionally supported by screws 58 extending into the bracket 24.

The broach pulling head 52, as best seen in Figure 3, is provided with a recess 60 which receives the inner end of the broach 36. The broach is provided adjacent its inner end with a downwardly open transversely extending recess 62 which receives and partially surrounds a pivot pin 64. Thus the broach 36 is mounted for rocking movement inwardly and outwardly of the recess 32 of the horn 28 about the axis of the pivot pin 64. In order to provide a force maintaining the body or cutting portion of the broach 36 in contact with the bottom or upper surface of the recess 32, a compression spring 66 is provided, the lower end of which engages the inner end of the broach 36 and the upper end of which is received within a spring seat located in a threaded adjusting element 68. Suitable means including operating buttons 70, are provided for controlling reciprocation of the broach pulling head 22, but these constitute no part of the present invention and accordingly will not be described in detail.

With the parts in the position shown in Figure 3 it will be observed that the broach 36 is located in its innermost position relative to the recess 32 in the horn 28, and that a camming shoulder 72 on the broach is located outwardly or to the right of the inclined step 38 at the bottom of the recess 32. With the broach and horn in this relative position it is possible to advance the work piece P to the position shown in dotted lines in Figure 3, at which time it is received within the concave portion 74 of the fixture 26 and is properly located therein by engagement between the horn 28 and the hole in the work piece. At this time fluid is admitted to the motor or power cylinder 18 in a direction to move the broach pulling head 22 to the left. Initial movement of the broach to the left causes the inclined camming portion 72 of the broach to ride up on the inclined step 38 at the bottom of the recess 32, thus moving the broach downwardly, or outwardly with respect to the recess, into cutting position. The cutting operation takes place as the broach moves to the left, and if desired, the broach may be completely withdrawn from the work piece after which the work piece is readily withdrawn from the horn and replaced by a second work piece. If preferred, it is unnecessary for the broach to be moved completely out of the work piece since if desired, the bottom wall of the recess 32 may be shaped to permit retraction of the cutting portion of the broach into the recess after the last cutting tooth has cleared the work. For this purpose the dwell portion at the bottom of the elongated recess in the horn may terminate as indicated at 76. With this arrangement the broach is retracted into the recess in the horn at both ends of its cutting stroke and is cammed outwardly only during the intermediate portion of its cutting stroke. In either case, upon completion of the cutting stroke the broach is in a position in which it does not interfere with removal of the work piece and the work piece may be withdrawn without again contacting the broach. Alternatively of course, it would be possible to return the broach to the position illustrated in Figure 3 before removing the work piece but this would involve drawing the cutting teeth of the broach reversely over the broached surface, which is undesirable.

The drawings and the foregoing specification constitute a description of the improved broach in such full, clear, concise and exact terms as to enable any person skilled in the art to practice the invention, the scope of which is indicated by the appended claims.

What we claim as our invention is:

1. Broaching apparatus comprising a frame part having a machined locating surface thereon, a horn having a free end and a supported end provided with a laterally extending flange, said flange having a locating surface engageable with the locating surface of said frame part, a work supporting and locating fixture having a locating surface engageable with the locating surface of said frame part and having a recess in which the flange of said horn is received, aligned keyways in said frame part, said flange, and said fixture, a key in said keyways, said horn having an elongated recess extending from its supported end to the other end thereof, a broach reciprocable in said recess, resilient means urging said broach inwardly of the recess in said horn to a clearance position which permits a work piece to be loaded and unloaded over the free end of said horn, cam means between said broach and horn operable to shift said broach outwardly of said recess to cutting position upon initial movement of said broach longitudinally of said horn toward the supported end thereof, and means for traversing said broach in a cutting stroke toward the supported end of said horn and an idle return stroke toward the free end of said horn.

2. Apparatus as defined in claim 1 in which said cam means is shaped to provide for inward movement of said broach to clearance position at both ends of its stroke.

3. Broaching apparatus comprising a frame having an upstanding portion, said portion having a horizontally extending opening therethrough, a horn extending from one side of said portion, said horn having an elongated recess therein in registry with the opening through said portion, a broach extending through said opening and at least partly received in said recess, motor means on said frame spaced horizontally from said frame portion, horizontal guide elements extending between said motor means and said frame portion, a cross head on said guide elements, means connecting said cross head to said motor means, said cross head having a recess therein receiving an end of said broach, pivot means within said last recess engaging said broach, a spring in said recess having one end engaging said broach at a point spaced from said pivot means to bias said broach inwardly of the recess in said horn, and cam surfaces on said horn and broach effective to cam said broach outwardly of the recess in said horn into cutting position upon initial movement of said broach in a cutting stroke.

References Cited in the file of this patent

UNITED STATES PATENTS

| Number | Name | Date |
|---|---|---|
| 827,816 | Owen | Aug. 7, 1906 |
| 828,425 | Ruedy | Aug. 14, 1906 |
| 1,233,373 | La Pointe | July 17, 1917 |
| 2,086,111 | Andrews | July 6, 1937 |
| 2,330,584 | Hoagland | Sept. 28, 1943 |
| 2,393,646 | Markstrum | Jan. 29, 1946 |

FOREIGN PATENTS

| Number | Country | Date |
|---|---|---|
| 368,757 | Great Britain | Mar. 8, 1932 |